United States Patent
Feldbaum et al.

(10) Patent No.: US 8,136,227 B2
(45) Date of Patent: Mar. 20, 2012

(54) METHOD FOR MAKING A MAGNETIC HEAD HAVING A NON-GMR SHUNT

(75) Inventors: Michael Feldbaum, San Jose, CA (US); Quang Le, San Jose, CA (US); Edward H. Lee, San Jose, CA (US); Neil L. Robertson, Palo Alto, CA (US); Charles G. Seegel, III, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 465 days.

(21) Appl. No.: 11/247,081

(22) Filed: Oct. 11, 2005

(65) Prior Publication Data
US 2007/0081278 A1   Apr. 12, 2007

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/32; 216/65; 216/66; 360/324.1; 360/324.11; 360/324.12; 360/324.2

(58) Field of Classification Search .. 29/603.13–603.16, 29/603.18; 216/62, 65, 66; 360/324.1, 324.2, 360/324.11, 324.12; 451/541
See application file for complete search history.

(56) References Cited

U.S. PATENT DOCUMENTS

| | | | |
|---|---|---|---|
| 5,255,141 A | 10/1993 | Valstyn et al. | |
| 5,883,764 A * | 3/1999 | Pinarbasi | 360/322 |
| 5,976,713 A | 11/1999 | Fuke et al. | |
| 6,018,443 A | 1/2000 | Watanabe et al. | |
| 6,741,431 B2 | 5/2004 | Funayama et al. | |
| 6,858,909 B2 * | 2/2005 | Cyrille et al. | 257/414 |
| 2004/0207962 A1 | 10/2004 | Saito et al. | |
| 2004/0218309 A1 | 11/2004 | Seigler | |
| 2005/0068665 A1 | 3/2005 | Le Quang et al. | |

\* cited by examiner

*Primary Examiner* — Paul D Kim
(74) *Attorney, Agent, or Firm* — Merchant & Gould

(57) ABSTRACT

A magnetic head having non-GMR shunt for perpendicular recording and method for making magnetic head having non-GMR shunt for perpendicular recording is disclosed. A shunt is provided for shunting charge from a read sensor. The shunt is formed co-planar with the read sensor and is fabricated using non-GMR materials.

9 Claims, 12 Drawing Sheets

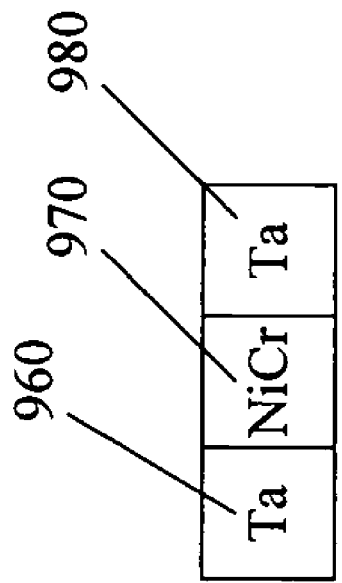
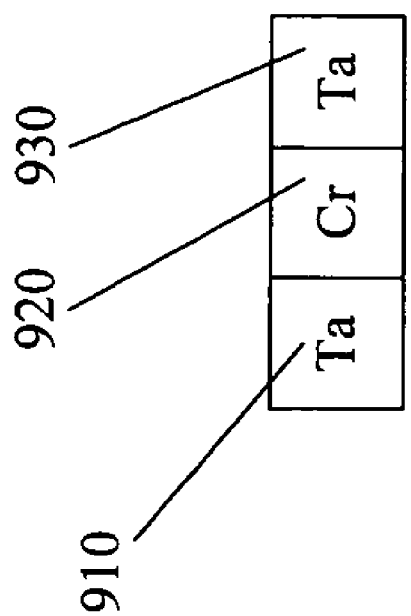
Fig. 9b
Fig. 9a

METHOD FOR MAKING A MAGNETIC HEAD HAVING A NON-GMR SHUNT

BACKGROUND OF THE INVENTION

1. Field of the Invention

This invention relates in general to magnetic storage devices, and more particularly to a magnetic head having non-GMR shunt for perpendicular recording and method for making magnetic head having non-GMR shunt for perpendicular recording.

2. Description of Related Art

Modern computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. In such devices, read-write heads are used to write data on or read data from an adjacently rotating hard or flexible disk.

A head/disk assembly typically includes one or more commonly driven magnetic data storage disks rotatable about a common spindle. At least one head actuator moves one or more magnetic read/write heads radially relative to the disks to provide for reading and/or writing of data on selected circular concentric tracks of the disks. Each magnetic head is suspended in close proximity to one of the recording disks and supported by an air bearing slider mounted to the flexible suspension. The suspension, in turn, is attached to a positioning actuator.

During normal operation, relative motion between the head and the recording medium is provided by the disk rotation as the actuator dynamically positions the head over a desired track. The relative motion provides airflow along the surface of the slider facing the medium, creating a lifting force. The lifting force is counterbalanced by a known suspension load so that the slider is supported on a cushion of air. Airflow enters the leading edge of the slider and exits from the trailing end. The head normally resides toward the trailing end, which tends to fly closer to the recording surface than the leading edge.

Existing magnetic storage systems use magnetoresistive (MR) heads to read data from magnetic media and to uses inductive heads to write data onto magnetic media. MR disk drives use a rotatable disk with concentric data tracks containing the user data, a read/write head that may include an inductive write head and an MR read head for writing and reading data on the various tracks, a data readback and detection channel coupled to the MR head for processing the data magnetically recorded on the disk, an actuator connected to a carrier for the head for moving the head to the desired data track and maintaining it over the track centerline during read or write operations.

There is typically a plurality of disks stacked on a hub that is rotated by a disk drive spindle motor. A housing supports the drive motor and head actuator and surrounds the head and disk to provide a substantially sealed environment for the head-disk interface. The head carrier is typically an air-bearing slider that rides on a bearing of air above the disk surface when the disk is rotating at its operational speed. The slider is maintained in very close proximity to the disk surface by a suspension that connects the slider to the actuator. The spacing between the slider and the disk surface is called the flying height and its precise value is critical to the proper function of the reading and writing processes.

The inductive write head and MR read head are patterned on the trailing end of the slider, which is the portion of the slider that flies closest to the disk surface. The slider is either biased toward the disk surface by a small spring force from the suspension, and/or is "self-loaded" to the disk surface by means of a "negative-pressure" air-bearing surface on the slider.

The MR sensor detects magnetic field signals through the resistance changes of a magnetoresistive element, fabricated of a magnetic material, as a function of the strength and direction of magnetic flux being sensed by the element. MR sensors have application in magnetic recording systems because recorded data can be read from a magnetic medium when the external magnetic field from the recorded magnetic medium (the signal field) causes a change in the direction of magnetization in an MR read head. This in turn causes a change in electrical resistance in the MR read head and a corresponding change in the sensed current or voltage. The conventional MR sensor used in magnetic recording systems operates on the basis of the anisotropic magnetoresistive (AMR) effect in which a component of the element resistance varies as the square of the cosine of the angle between the magnetization in the element and the direction of sense or bias current flow through the element.

A different and more pronounced magnetoresistance, called giant magnetoresistance (GMR), has been observed in a variety of magnetic multilayered structures, the essential feature being at least two ferromagnetic metal layers separated by a non-ferromagnetic metal layer. The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes. A particularly useful application of GMR is a sandwich structure comprising two essentially uncoupled ferromagnetic layers separated by a non-magnetic metallic spacer layer in which the magnetization of one of the ferromagnetic layers is "pinned", and thus prevented from rotating in the presence of an external magnetic field. This type of MR sensor is called a "spin valve" sensor.

The read sensor is disposed between shields. The shields are conductive, and with the read sensor and its contacts, form a capacitor. The capacitance is dependent on the area extension and the insulating material between the shields and the read sensor. During the operation, an electrical charge may accumulate on the conductive shields and suddenly discharge by a transient conductive path between the read sensor and the shields.

Previous attempts have been made to prevent the charge buildup by making a short circuit connection between the read sensor and the shields. Unfortunately, such shunts have been formed using GMR material. However, the transfer curve for read heads having a GMR shunt is not fully linear. The GMR shunt results in a transfer curve that includes a "kink" near a zero magnetic field.

It can be seen then that there is a need for a magnetic head having non-GMR shunt for perpendicular recording and method for making magnetic head having non-GMR shunt for perpendicular recording.

SUMMARY OF THE INVENTION

To overcome the limitations in the prior art described above, and to overcome other limitations that will become apparent upon reading and understanding the present specification, the present invention discloses a magnetic head having non-GMR shunt for perpendicular recording and method for making magnetic head having non-GMR shunt for perpendicular recording.

The present invention solves the above-described problems by providing a shunt for shunting charge from a read sensor. The shunt is formed co-planar with the read sensor and is fabricated using non-GMR materials.

A method for making a magnetic head having non-GMR shunt for perpendicular recording in accordance with the principles of the present invention includes forming a sensor, depositing over the sensor a photoresist layer having a predetermined shape, removing a portion of the sensor exposed by the photoresist layer to form a void, refilling the void with a non-GMR material and removing the photoresist layer.

In another embodiment of the present invention, a read head is provided. The read head includes a read sensor and a shunt formed co-planar with the read sensor, wherein the shunt comprising a non-GMR material.

In another embodiment of the present invention, a storage device is provided. The storage device includes a magnetic recording medium for recording data thereon, a slider having a perpendicular read/write head coupled to the slider, the read head including a read sensor, a motor, coupled to the magnetic recording medium, for translating the magnetic recording medium and an actuator, coupled to the slider having the perpendicular read/write head, for translating the perpendicular read/write head relative to the magnetic recording medium, wherein the perpendicular read/write head further comprises a shunt co-planar with the read sensor of the read head and comprising a non-GMR material.

In another embodiment of the present invention, another read head is provided. This read head includes means for sensing data recording on a magnetic medium and means for shunting charge from the means for sensing data, the means for shunting being co-planar with the means for sensing data and comprising a non-GMR material.

In another embodiment of the present invention, another storage device is provided. The storage device includes means for recording data thereon, means for flying a perpendicular read/write means including means for sensing data written on the means for recording data, means, coupled to the means for recording data, for translating the means for recording data and means, coupled to the means for flying, for translating the means for flying relative to the means for recording data, wherein the read/write means further comprises a means for shunting charge from the means for sensing data, the means for shunting being co-planar with the means for sensing data and comprising a non-GMR material.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 9A-B show structures of the non-GMR shunt for perpendicular recording according to embodiments of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a magnetic head having non-GMR shunt for perpendicular recording and method for making magnetic head having non-GMR shunt for perpendicular recording. A shunt is provided for shunting charge from a read sensor. The shunt is co-planar with the read sensor and is formed using non-GMR materials.

Figure 1:
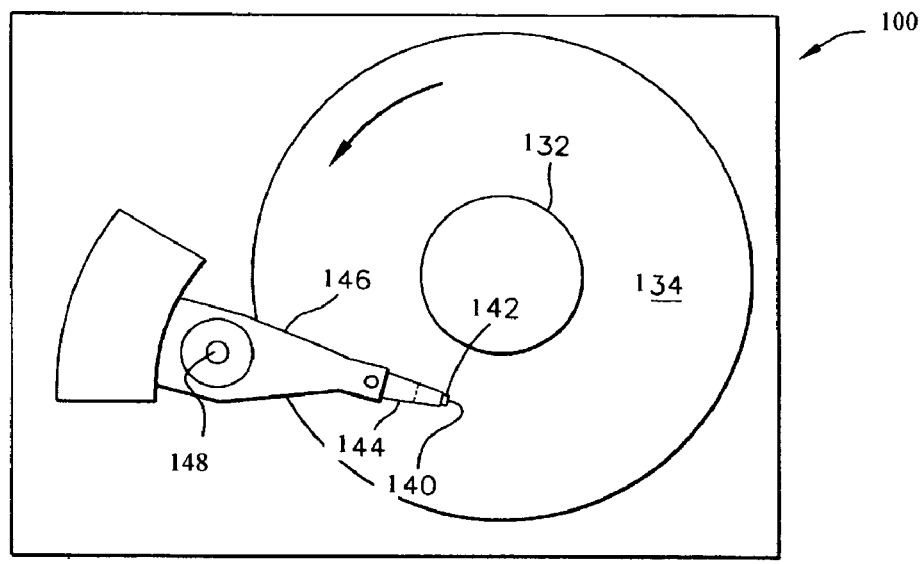
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
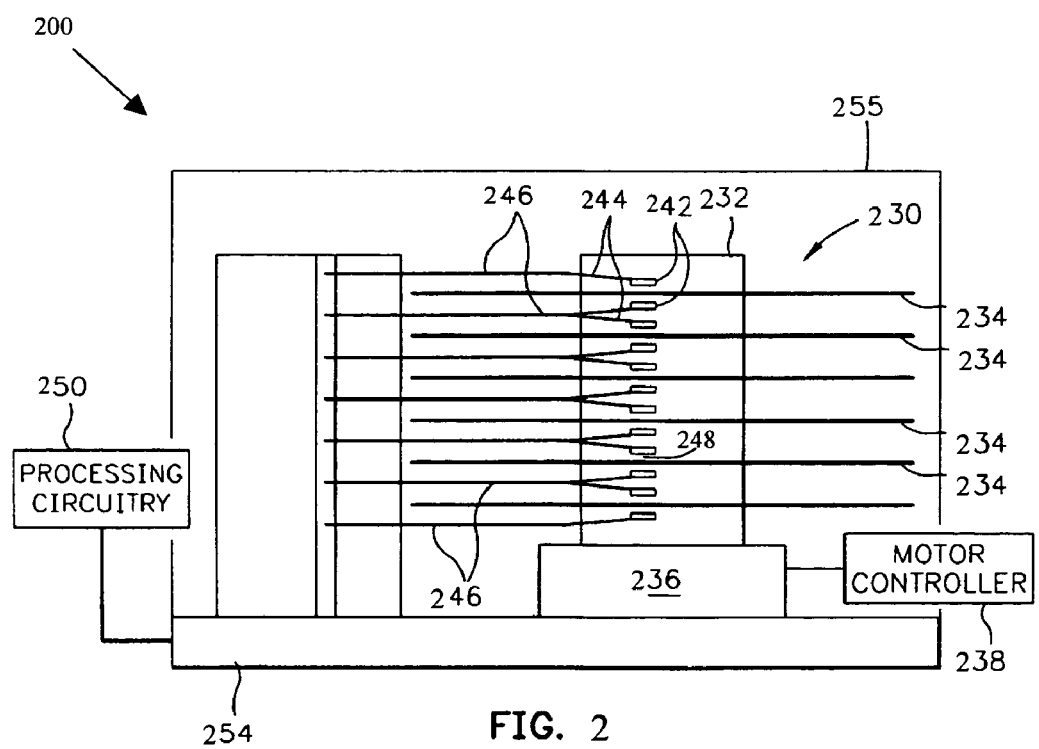
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234, the slider 242 is supported on a thin cushion of air (air bearing) between the surface of the disk 234 and the air-bearing surface (ABS) 248. The magnetic head may then be employed for writing information to multiple circular tracks on the surface of the disk 234, as well as for reading information therefrom.

Figure 3:
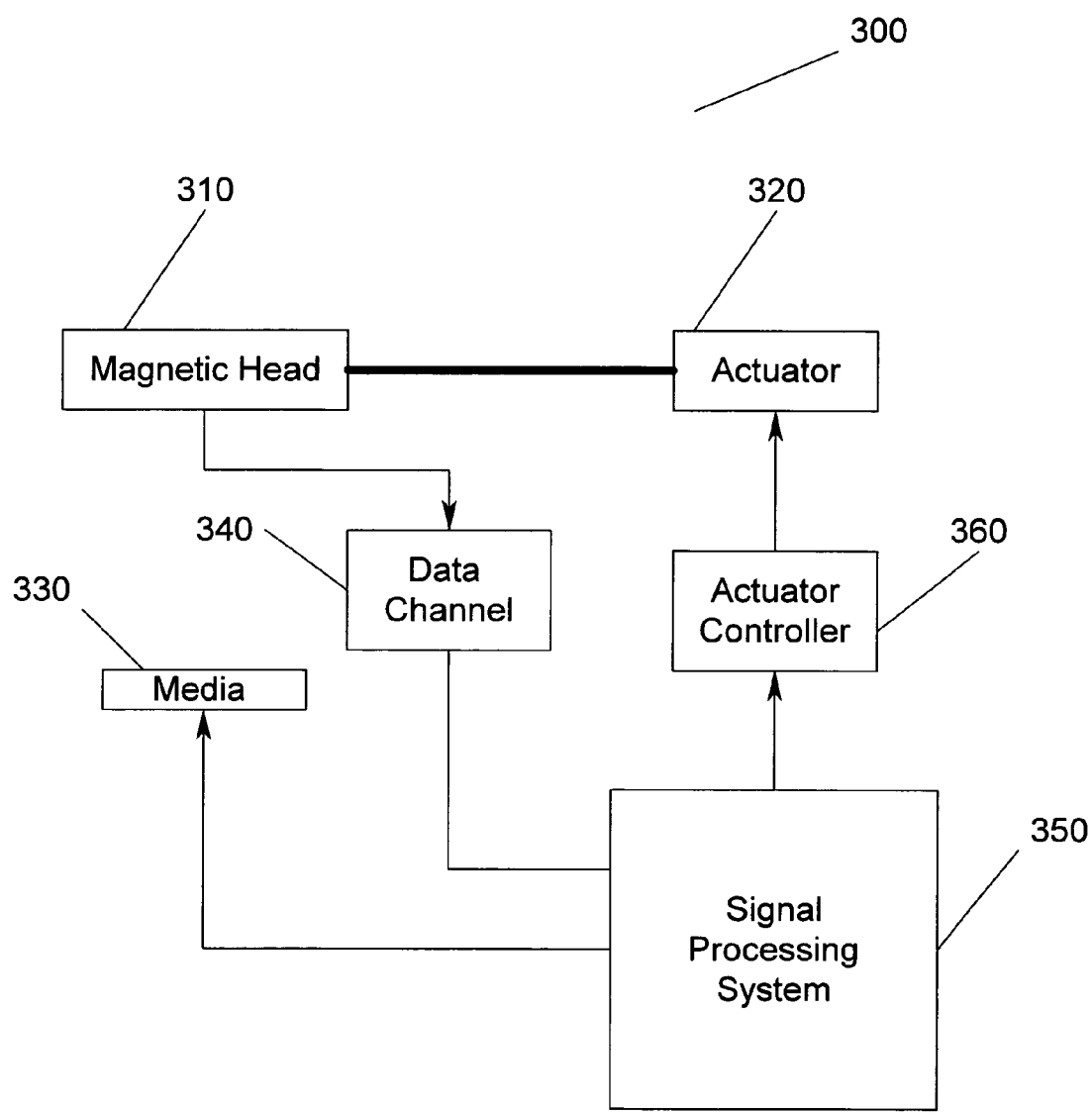
FIG. 3 illustrates a storage system according to the present invention.

FIG. 3 illustrates a storage system 300 that uses a MR sensor for sensing contact of the MR head with a recording medium based upon resistance changes in the MR element according to an embodiment of the present invention. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, an actuator controller 360 is controlled by the signal processor system 350 to cause the read/write transducer 330 to move relative to the magnetic media 310. Nevertheless, the present invention is not meant to be limited to a particular type of storage system 300 or to the type of media 330 used in the storage system 300.

Figure 4:
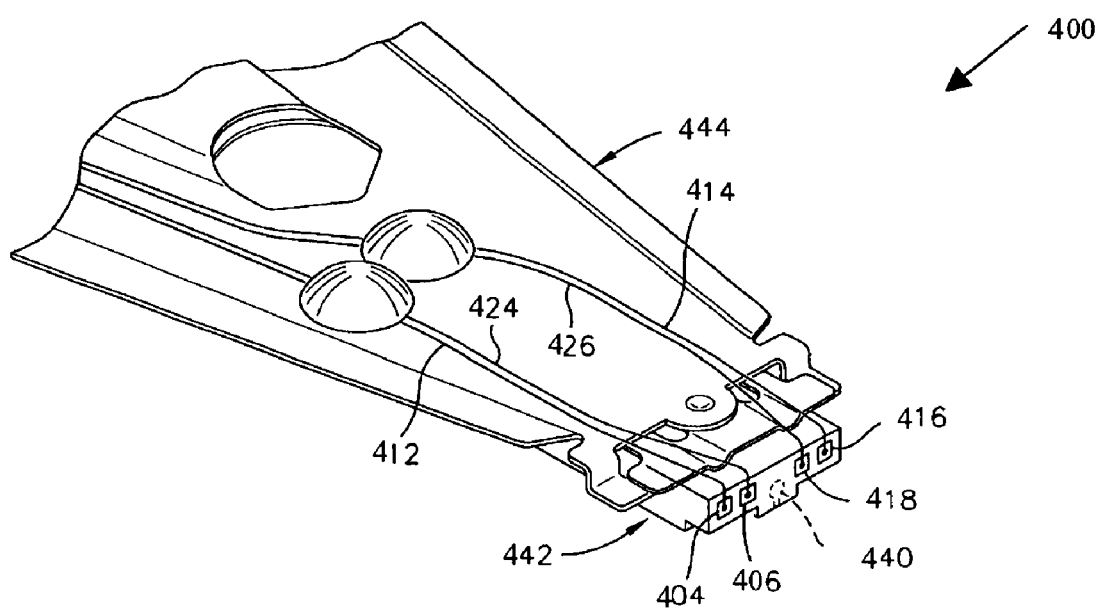
FIG. 4 is an isometric illustration of a suspension system for supporting a slider having a magnetic head mounted thereto.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5:
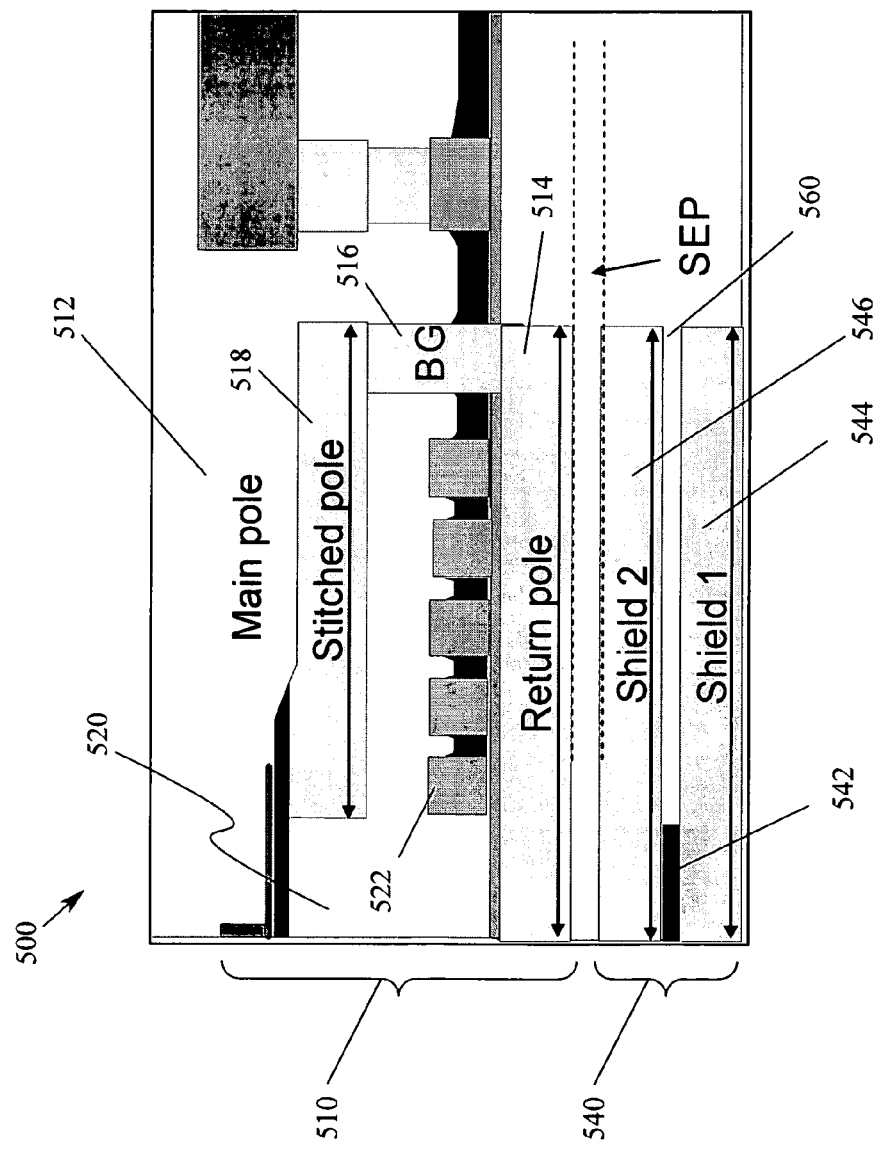
FIG. 5 is a side cross-sectional view of a perpendicular magnetic head according to an embodiment of the present invention.
Figure 6:
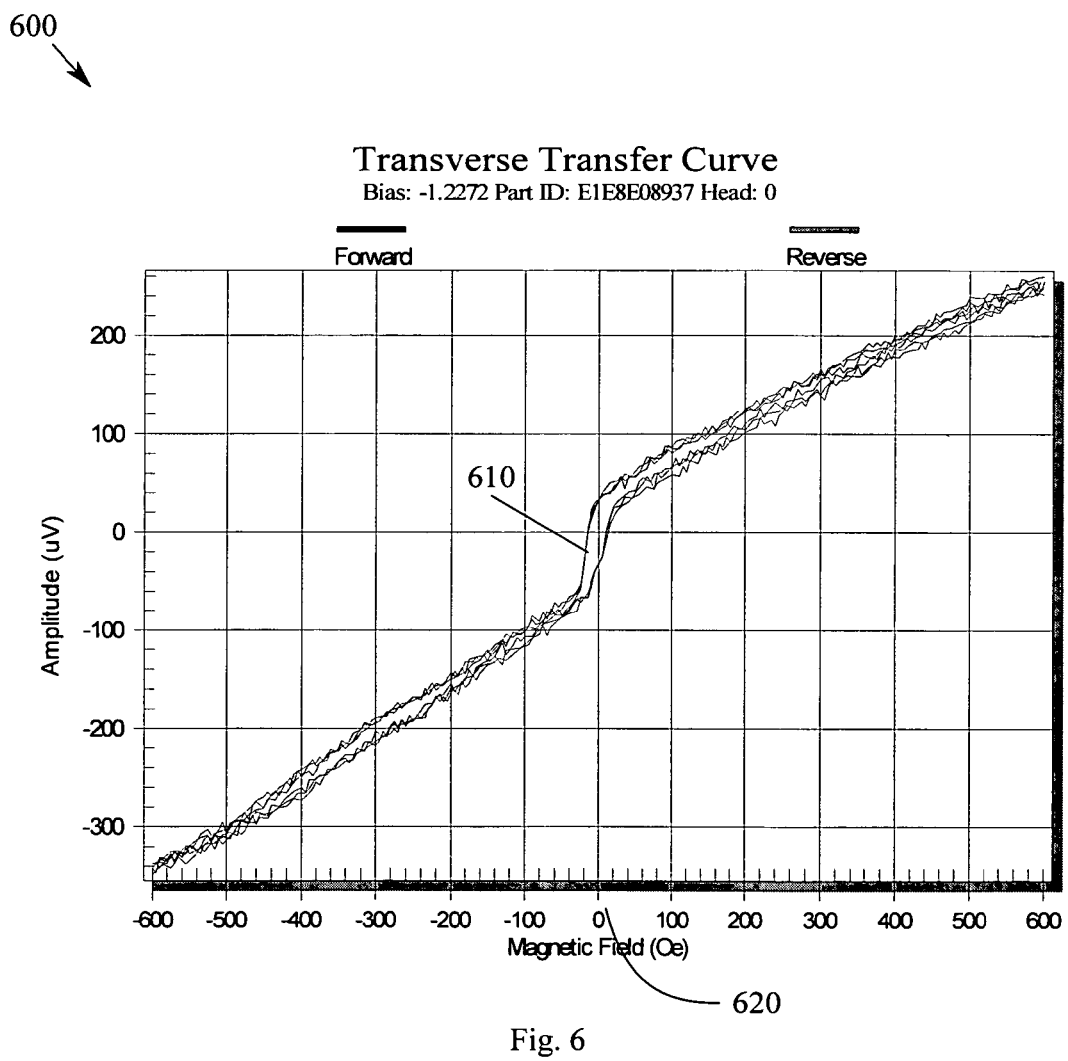
FIG. 6 is a graph of the transfer curve of a magnetic head having a shunt formed using GMR material.

FIG. 5 is a side cross-sectional view of a perpendicular magnetic head 500 according to an embodiment of the present invention. The write head 510 includes main pole 512 and return pole 514 which extend from the ABS to back gap portion 516, which is recessed in the head. The main pole 512 includes a stitched pole piece 518. Located between the main pole 512 and return pole is an insulation layer 520 which extends from the ABS to the back gap layer 516 and has embedded therein at least one write coil layer 522. Read head 540 includes sensor 542 and shields, S1 544 and S2 546. The first 544 and second 546 shield layers protect the sensor 542 from stray magnetic fields. To protect the read sensor 542 a shunt 560 is provided. However, as shown in FIG. 6, a shunt formed using GMR material results in a transfer curve 600 that is not fully linear. In FIG. 6, the transfer curve 600 is linear except for the "kink" 610 near a zero magnetic field 620. In FIG. 5, the read sensor 542 is coupled to a non-GMR material 560 that acts as a shunt to the read sensor 542. In FIG. 5, the non-GMR material 560 is only shown to the right of the read sensor 542 because the non-GMR material 560 adjacent to the side of the read sensor 542 is not shown in this cross-sectional view of the perpendicular magnetic head 500.

Figure 7:
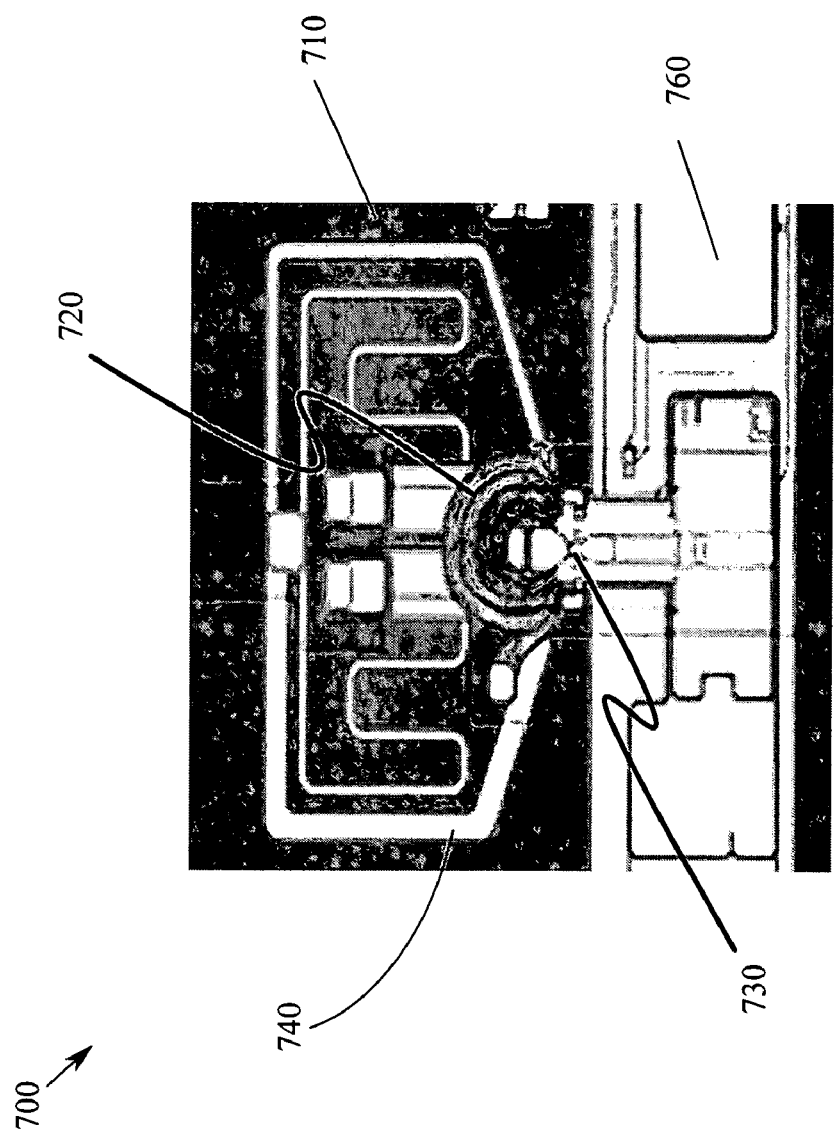
FIG. 7 shows the structure of the perpendicular head including the non-GMR shunt according to an embodiment of the present invention.

FIG. 7 shows the structure of the perpendicular head 700 including the non-GMR shunt 710 according to an embodiment of the present invention. In FIG. 7, the coils 720 for the write head are clearly visible in the center. The non-GMR shunt 710 is shown around the sensor 730 and leads 740 for the read sensor 730 are shown formed over the non-GMR shunt 710. Also shown in FIG. 7 is the wafer level ESD protection 760 that is removed. Not only must the GMR material be replaced with non-GMR material to form a non-GMR shunt 710, but also the process must be compatible with current fabrication techniques.

Figure 8B:
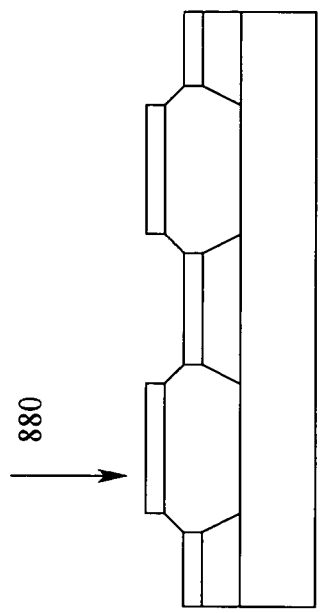
FIG. 8A-D illustrates a method for fabricating a sensor according to an embodiment of the present invention.
Figure 8D:
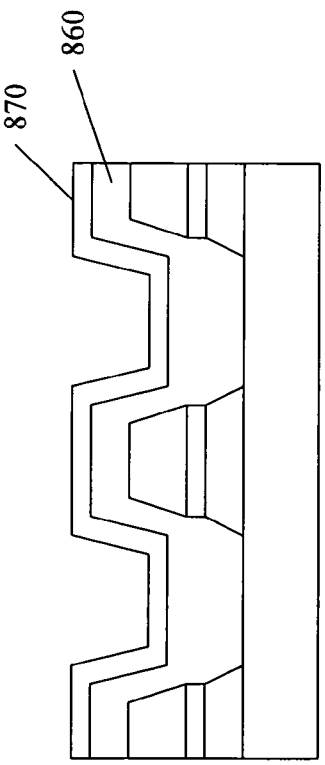
Figure 8A:
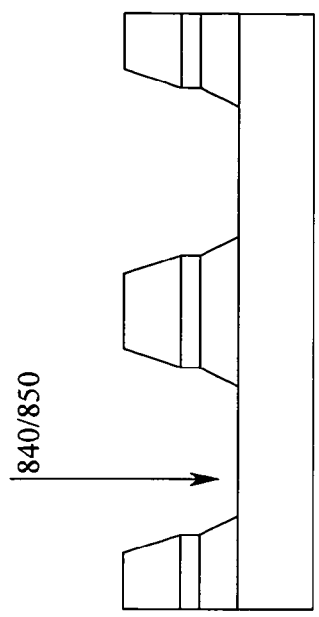
Figure 8C:
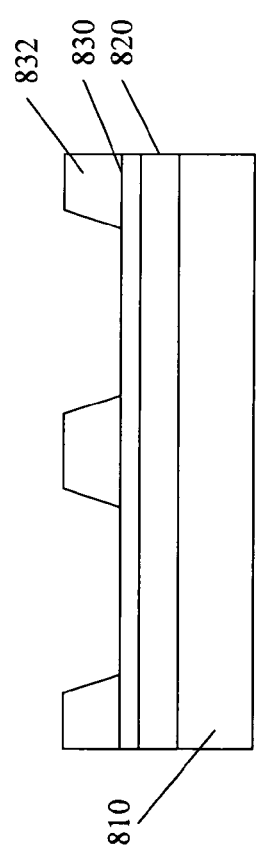

FIG. 8A-D illustrates a method for fabricating a current-in-plane (CIP) sensor according to an embodiment of the present invention. In FIG. 8A, the sensor 810 is formed and diamond-like carbon (DLC) 820 and a hard mask 830 are deposited. A photoresist 832 is formed over the hard mask to define the sensor's stripe height and the shunt line. FIG. 8B shows reactive ion etching (RIE) 840 and ion milling 850. Reactive ion etching (RIE) 840, e.g., with $O_2$ or $CO_2$ chemistry, is performed to transfer the photo image through the DLC layer 820 followed by ion milling 850 to transfer the image into the sensor 810. FIG. 8C shows the deposit of alumina 860. A layer of DLC 870 is then deposited. FIG. 8D shows CMP-assisted lift-off (chemical-mechanical polishing) removal of the hard mask, fencing, and redeposited materials. The DLC may reactive ion etched 880.

The process for defining the stripe height and shunt lines in FIGS. 8A-D shows alumina being deposited in FIG. 8C. However, the same process may be used to define the magnetic read width (MRW). When this process is used to define the magnetic read width (MRW), the refill material 860 in FIG. 8C is hard bias and lead material instead. While the process of FIGS. 8-D has been described with reference to a CIP sensor, the process may also be used to form TMR (tunnel magnetoresistive) and CPP (current-perpendicular-to-plane) sensors.

To replace the shunt line with non-GMR, the selection of the non-GMR material, e.g., its chemical, physical and electrical properties, is important. For example, the chemical properties of the non-GMR material should include being inert toward CMP slurry during polishing. The physical properties of the non-GMR material should be CMP resistance (similar rate as sensor), have good adhesion to DLC, and most importantly, the non-GMR has to have equal or higher ion mill rate as the sensor. The electrical properties should include being an effective shunt and having a similar sheet resistance as the sensor. To provide these electrical properties, the material's thickness may be adjusted to achieve the desired sheet resistance or the shunt area may be designed to provide the desired sheet resistance.

FIG. 9A-B show structures of the non-GMR shunt for perpendicular recording according to embodiments of the present invention. Depending on the thickness of the sensor, the non-GMR shunt may involve two structures. A first embodiment of the structure of the non-GMR shunt may include Ta/Cr/Ta. Ta 910 exists in two phases: alpha and beta. The alpha is low resistance while beta is high resistance. In the Ta(1)/Cr/Ta(2) structure, Cr 920 induces Ta(1) 910 to be in the beta phase and Ta(2) 930 in the alpha phase. Ta(1) 910 and Cr 920 thickness are adjusted to achieve desire sheet resistance and similar ion mill rate as sensor. Ta(2) 930 can be removed if adhesion is not an issue, i.e., the structure may be Ta/Cr.

A second embodiment of the structure of the non-GMR shunt may include Ta/NiCr/Ta. For example, the structure of the non-GMR shunt may be Ta/NiCr, NiCr/Ta, Ta/NiCr/Ta or NiCr. FIG. 9B shows Ta/NiCr/Ta structure having a first layer of Ta 960, a layer of NiCr 970 and a second layer of Ta 980. The NiCr 970 has the same sheet resistance as the sensor. Ta is added to tune its sheet resistance and ion mill rate to the sensor. Ta in its alpha low resistance phase is used adjust the sheet resistance of the NiCr if needed. While two embodiments are shown by way of FIGS. 9A and 9B, those skilled in the art will recognize that the present invention may include other structures of the non-GMR shunt for perpendicular recording.

Figure 10:
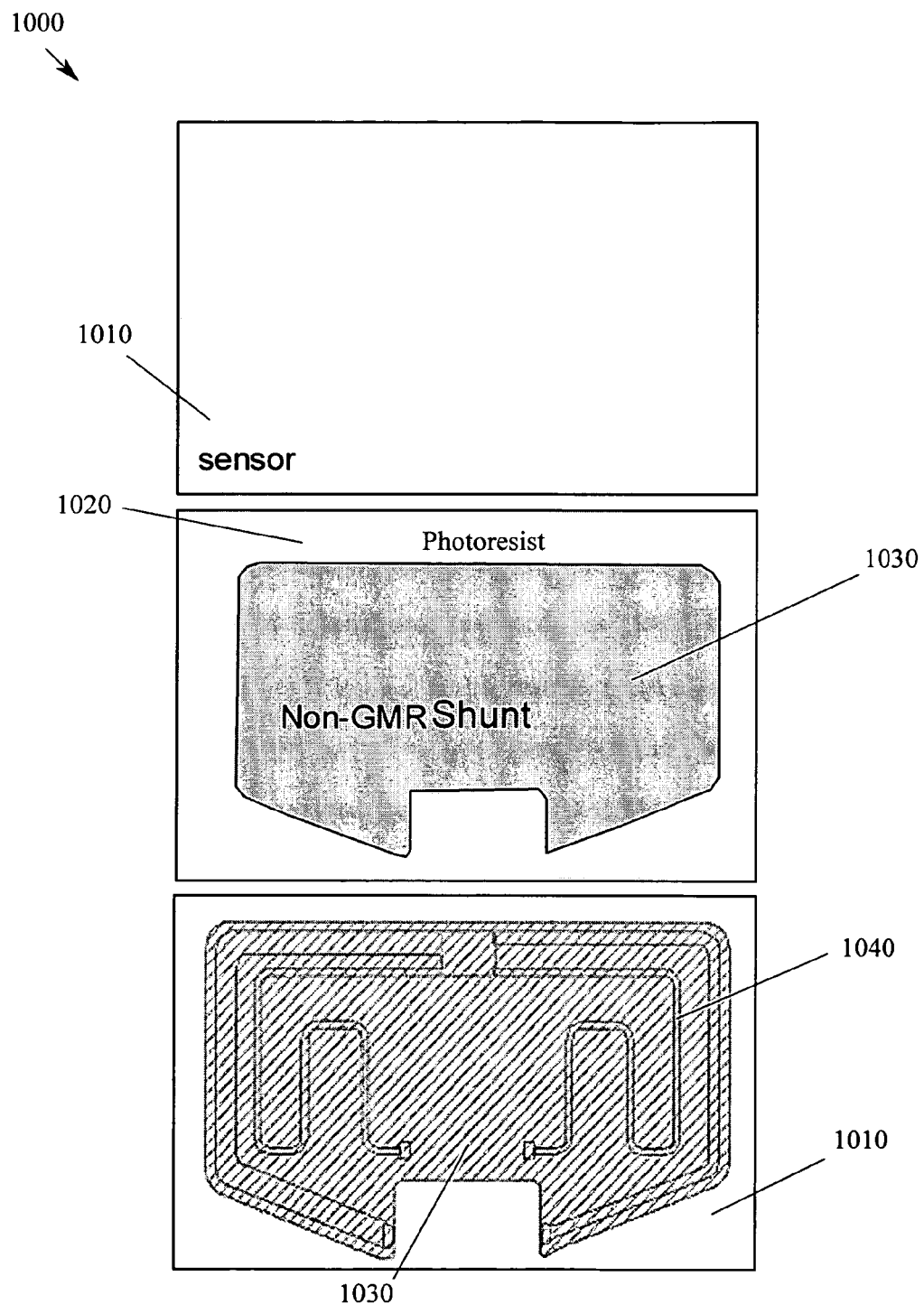
FIG. 10 shows the formation of a non-GMR shunt according to an embodiment of the present invention.

FIG. 10 shows the formation of a non-GMR shunt according to an embodiment of the present invention. A sensor 1010 is formed using conventional process. A photoresist 1020 for forming the shape of the non-GMR shunt is formed over the sensor 1010. The exposed sensor material is removed using, for example, ion milling techniques and the opening is then refilled with a non-GMR material 1030. For example, as described above, the non-GMR material may include NiCr/TA or Ta/Cr/Ta.

To match the sheet resistance and the ion mill rate of the non-GMR material 1030 to the sensor 1020, for example, the non-GMR material 1030 may be tuned to have a higher ion mill rate than the sensor, to be thicker, and achieve the same sheet resistance as the sensor. In this case, the ion mill may be deeper. Thereafter, the photoresist 1010 is removed. For example, the photoresist may be removed using a wrinkle bake and lift-off process. Then, the additional processing, such as formation of the track width, stripe height and formation of the sensor leads 1040, are formed over the non-GMR shunt 1030. FIGS. 8A-B described in greater detail the process for defining the shunt and stripe height after the formation of the non-GMR shunt.

Figure 11B:
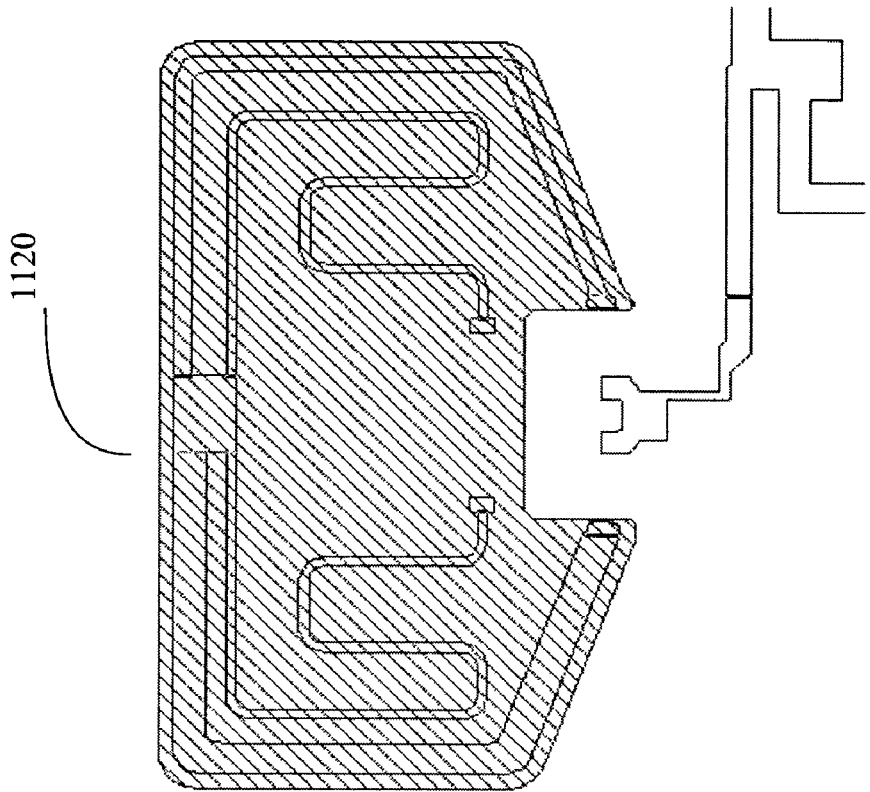
FIGS. 11A and 11B show two shapes for a non-GMR shunt according to embodiments of the present invention.
Figure 11A:
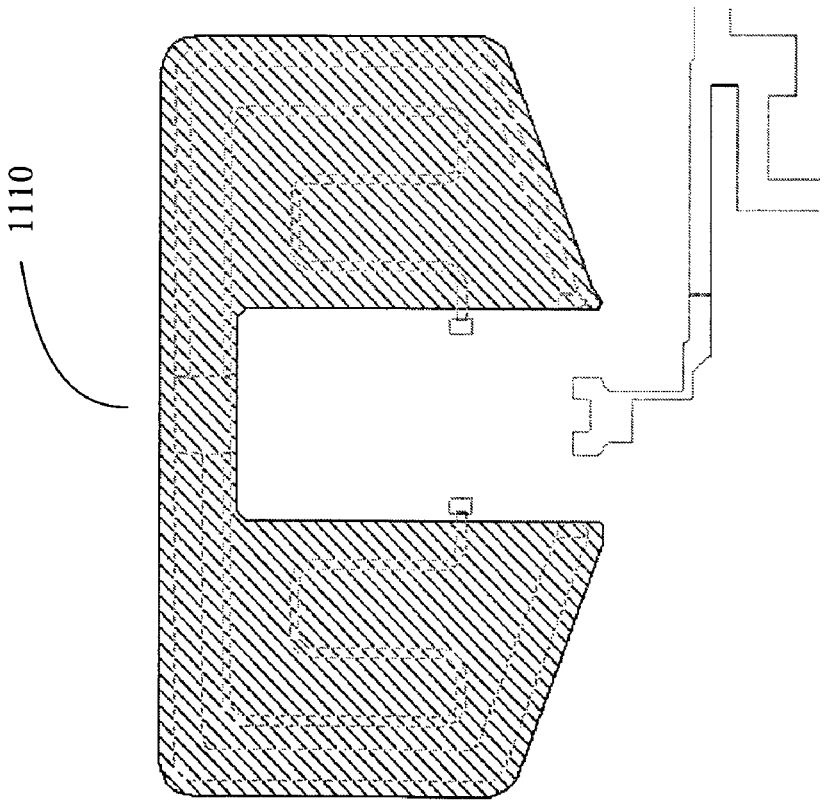
Figure 12A:
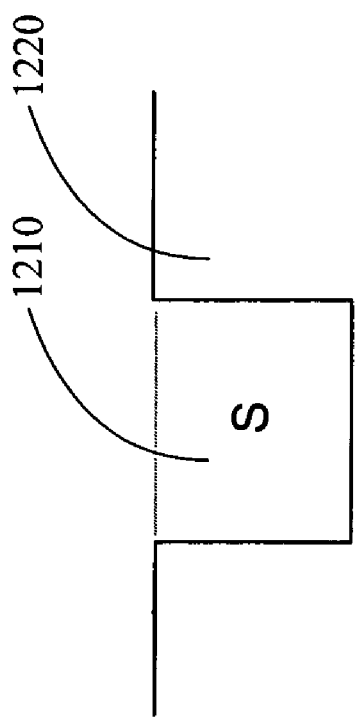
FIGS. 12A-B show the level of the non-GMR shunt relative to the $Al_2O_3$ layer according to embodiments of the present invention.
Figure 12B:
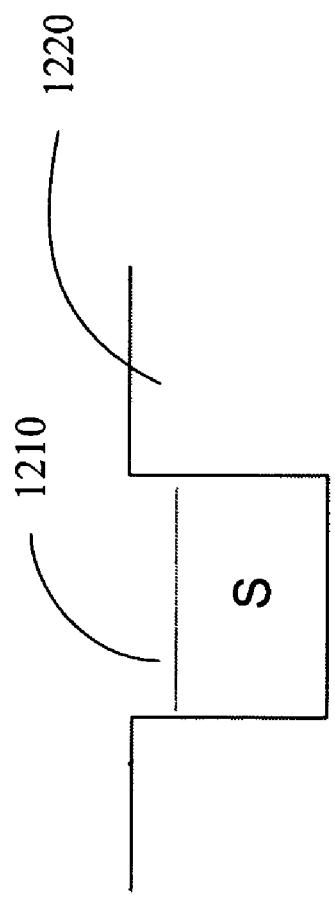

FIGS. 11A and 11B show two shapes 1110, 1120 for a non-GMR shunt according to embodiments of the present invention. FIGS. 12A-B show the level of the non-GMR shunt 1210 relative to the $Al_2O_3$ layer 1220 according to embodiments of the present invention. The relative level of the non-GMR shunt 1210 relative to the $Al_2O_3$ layer 1220 depends upon the milling and the backfill steps. The non-GMR shunt 1210 may be co-planar with the $Al_2O_3$ layer 1220 as shown in FIG. 12A or lower than the $Al_2O_3$ layer 1220 as shown in FIG. 12B. Because the Non-GMR material should be co-planar with the sensor as shown in FIG. 12A or slightly lower than the sensor as shown in FIG. 12B, the thickness of the non-GMR stack has to be control to achieve the desired sheet resistance.

Figure 13:
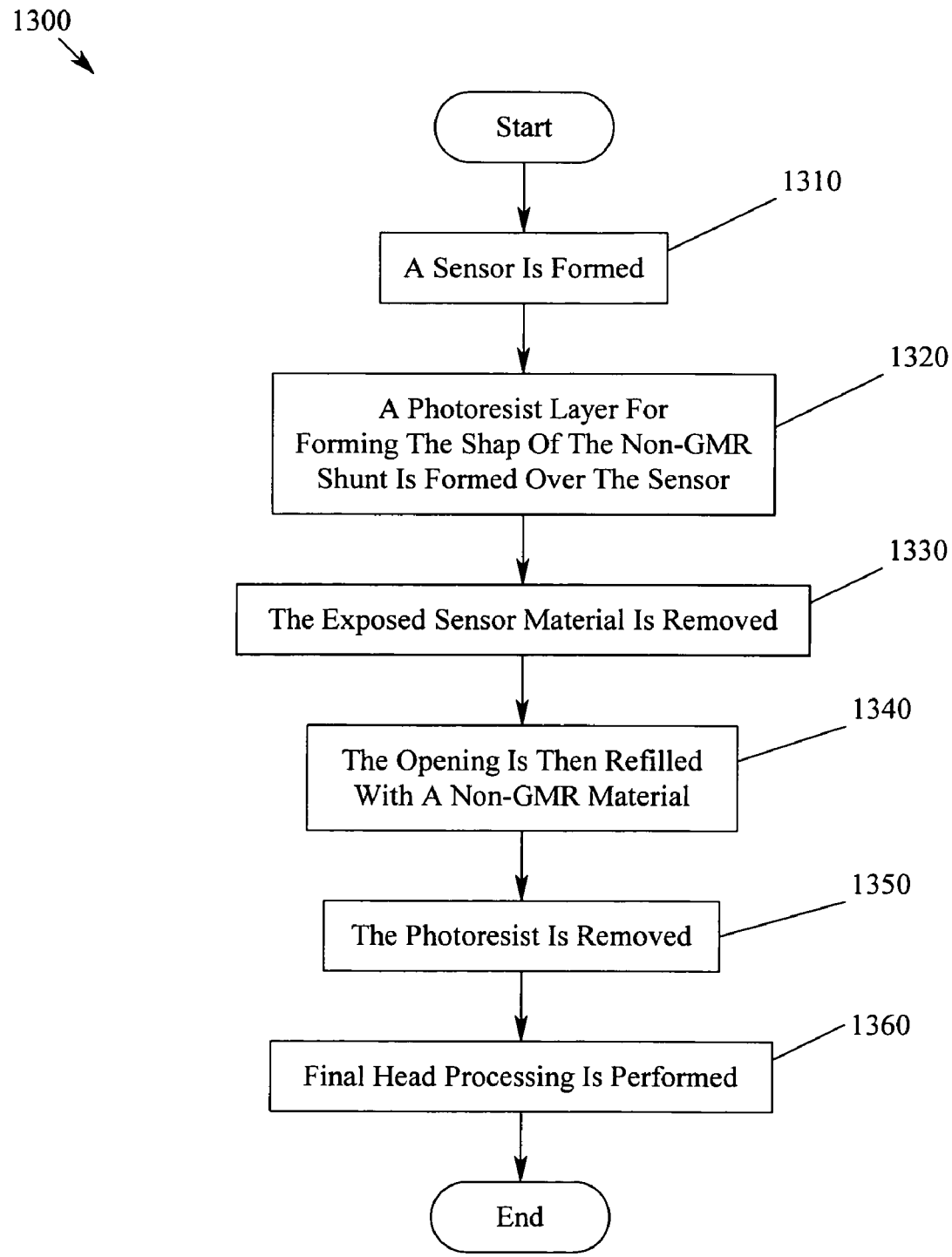
FIG. 13 is a flow chart of the method for forming a magnetic head having a non-GMR shunt according to an embodiment of the present invention.

FIG. 13 is a flow chart 1300 of the method for forming a magnetic head having a non-GMR shunt according to an embodiment of the present invention. A sensor is formed 1310. A photoresist layer for forming the shape of the non-GMR shunt is formed over the sensor 1320. The exposed sensor material is removed 1330. The opening is then refilled with a non-GMR material 1340. The photoresist and any excess non-GMR material are removed 1350 using, for example, a lift-off process. Final head processing is performed 1360.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for making a magnetic head having non-GMR shunt for perpendicular recording, comprising:
   forming a read head including a magnetic reading sensor disposed between a first and second shield;
   depositing over only a portion of the magnetic reading sensor a photoresist layer having a shape selected for exposing a portion of the magnetic reading sensor to form a shunt within the magnetic reading sensor and between the first and second shield to prevent charge buildup between the first and second shield;
   removing the portion of the magnetic reading sensor exposed by the photoresist layer to form a void in the magnetic reading sensor directly behind a portion of the magnetic reading sensor and between side portions of the magnetic reading sensor to produce the shape selected for forming the shunt;
   refilling the void with a non-GMR material to form the shunt circumscribing a back and the sides of the magnetic reading sensor;
   removing the photoresist layer; and
   forming leads to the magnetic reading sensor.

2. The method of claim 1, wherein the forming a read head including an magnetic reading sensor disposed between a first and second shield further comprises forming a read width and a stripe height for the magnetic reading sensor.

3. The method of claim 1, wherein the removing the portion of the magnetic reading sensor exposed by the photoresist layer further comprises ion milling the portion of the magnetic reading sensor exposed by the photoresist layer.

4. The method of claim 1, wherein the refilling the void with the non-GMR material further includes depositing NiCr/Ta.

5. The method of claim 1, wherein the refilling the void with the non-GMR material further includes depositing Ta/Cr/Ta.

6. The method of claim 1 further comprising forming an $Al_2O_3$ layer over the sensor.

7. The method of claim 6, wherein the forming the $Al_2O_3$ layer over the sensor further comprises forming an $Al_2O_3$ layer over the sensor co-planar with the shunt.

8. The method of claim 6, wherein the forming the $Al_2O_3$ layer over the sensor further comprises forming an $Al_2O_3$ layer over the sensor at a level uneven with the shunt.

9. A method for making a magnetic head having non-GMR shunt for perpendicular recording, comprising:
   forming a magnetic reading sensor using GMR material;
   depositing, over only a portion of the magnetic reading sensor, a photoresist layer having a shape selected for exposing a portion of the magnetic reading sensor located proximately centrally on the magnetic reading sensor for forming a shunt within the magnetic reading sensor to prevent charge buildup between the first and second shield;
   removing material of the magnetic sensor left exposed by the photoresist layer to form a void in the magnetic reading sensor having the shape selected for forming the shunt, wherein the void is formed proximately centrally in the magnetic sensor so that the void is bounded by a front portion of the GMR material of the magnetic reading sensor, a first and second side portion of the GMR material of the magnetic reading sensor and a back portion of the GMR material of the magnetic reading sensor;
   refilling the void having the shape selected for forming the shunt with a non-GMR material;
   removing the photoresist layer; and
   forming leads to the magnetic reading sensor.

* * * * *